US010210543B2

(12) United States Patent
Windmueller (10) Patent No.: US 10,210,543 B2
(45) Date of Patent: Feb. 19, 2019

(54) CUSTOMIZED LOYALTY NOTIFICATIONS (71) Applicant: GOOGLE INC., Mountain View, CA (US)

(72) Inventor: David K. Windmueller, Croton-on-Hudson, NY (US)

(73) Assignee: GOOGLE LLC, Mountain View, CA (US)

(*) Notice: Subject to any disclaimer, the term of this patent is extended or adjusted under 35 U.S.C. 154(b) by 340 days.

(21) Appl. No.: 14/246,135

(22) Filed: Apr. 6, 2014

(65) Prior Publication Data

US 2015/0287085 A1 Oct. 8, 2015

(51) Int. Cl.
G06Q 30/00 (2012.01)
G06Q 30/02 (2012.01)
G06Q 20/36 (2012.01)
G06Q 20/38 (2012.01)
G06Q 20/20 (2012.01)

(52) U.S. Cl.
CPC ....... G06Q 30/0261 (2013.01); G06Q 20/202 (2013.01); G06Q 20/363 (2013.01); G06Q 20/387 (2013.01); G06Q 30/0267 (2013.01)

(58) Field of Classification Search
None
See application file for complete search history.

(56) References Cited

U.S. PATENT DOCUMENTS 5,594,790 A * 1/1997 Curreri .................. H04M 3/36
379/265.12
6,182,050 B1 * 1/2001 Ballard ................. G06Q 30/02
705/14.61
(Continued)

FOREIGN PATENT DOCUMENTS

EP 2 420 854 A1 2/2012
EP 2 626 823 A1 8/2013
(Continued)

OTHER PUBLICATIONS

Christoffer Davidsson, Mobile Application Recommender System (Dec. 2010).*
(Continued)

Primary Examiner — Matthew T Sittner
(74) Attorney, Agent, or Firm — Johnson, Marcou & Isaacs, LLC (57) ABSTRACT A user accesses an account management system website via a user computing device and establishes a user account with the account management system. The user downloads an application onto the user computing device, which receives information for one or more loyalty cards. A loyalty card is associated with a merchant system location in response to a user request, in response to a request from a merchant device, in response to being read by a merchant POS device, or as a result of the loyalty card being identified by the account management system, based on aggregate data received from a plurality of user computing devices, as belonging to a loyalty card class associated with one or more merchant system locations. The user enters the merchant system location and the application detects the user computing device location. The application suggests the loyalty card according to user-configured alert settings.

20 Claims, 6 Drawing Sheets

(56) References Cited

U.S. PATENT DOCUMENTS

| | | | | |
|---|---|---|---|---|
| 8,417,569 B2* | 4/2013 | Gross | G06F 17/30861 | 705/14.41 |
| 2003/0013483 A1* | 1/2003 | Ausems | H04M 1/72522 | 455/556.1 |
| 2004/0260874 A1* | 12/2004 | Mori | G06F 3/0604 | 711/114 |
| 2006/0080171 A1* | 4/2006 | Jardins | G06Q 10/087 | 705/14.68 |
| 2006/0271425 A1* | 11/2006 | Goodman | G06Q 30/02 | 705/14.58 |
| 2007/0100688 A1* | 5/2007 | Book | G06Q 30/02 | 705/14.52 |
| 2007/0150347 A1* | 6/2007 | Bhamidipati | G06Q 30/02 | 705/14.54 |
| 2007/0150348 A1* | 6/2007 | Hussain | G06Q 30/02 | 705/14.54 |
| 2007/0162328 A1* | 7/2007 | Reich | G06Q 30/02 | 705/14.58 |
| 2007/0192369 A1* | 8/2007 | Gross | G06F 17/30861 | |
| 2008/0109300 A1* | 5/2008 | Bason | G06Q 30/02 | 705/14.73 |
| 2008/0215416 A1* | 9/2008 | Ismalon | G06F 17/30867 | 705/14.54 |
| 2009/0099911 A1* | 4/2009 | Ota | G06Q 30/02 | 705/14.66 |
| 2009/0112724 A1* | 4/2009 | Joo | G06Q 30/00 | 705/14.53 |
| 2009/0144155 A1* | 6/2009 | Lora | G06Q 30/02 | 705/14.62 |
| 2009/0328095 A1* | 12/2009 | Vinokurov | H04H 20/10 | 725/32 |
| 2010/0306225 A1* | 12/2010 | Mawani | G06Q 30/02 | 707/759 |
| 2011/0161161 A1* | 6/2011 | Juda | G06Q 30/02 | 705/14.42 |
| 2011/0264536 A1* | 10/2011 | Chodroff | G06Q 30/00 | 705/14.69 |
| 2012/0016742 A1* | 1/2012 | Jiang | G06Q 30/00 | 705/14.49 |
| 2012/0054022 A1* | 3/2012 | Kosashvili | G06F 17/30867 | 705/14.43 |
| 2012/0123841 A1* | 5/2012 | Taveau | G06Q 20/10 | 705/14.23 |
| 2012/0158471 A1* | 6/2012 | Jain | G06Q 30/0241 | 705/14.4 |
| 2012/0158502 A1* | 6/2012 | Chung | G06Q 30/0255 | 705/14.53 |
| 2012/0158519 A1* | 6/2012 | Edwards | G06Q 30/0272 | 705/14.68 |
| 2012/0198200 A1* | 8/2012 | Li | G06F 3/061 | 711/171 |
| 2012/0221407 A1* | 8/2012 | Erasmus | G06Q 30/02 | 705/14.43 |
| 2012/0246298 A1* | 9/2012 | McGowan | H04L 67/22 | 709/224 |
| 2012/0310760 A1* | 12/2012 | Phillips | G06Q 40/02 | 705/26.1 |
| 2013/0006754 A1* | 1/2013 | Horvitz | G06Q 30/00 | 705/14.43 |
| 2013/0254022 A1* | 9/2013 | Rubrecht | G06Q 30/0261 | 705/14.48 |
| 2014/0002736 A1* | 1/2014 | Kaushal | H04N 7/088 | 348/468 |
| 2014/0081767 A1* | 3/2014 | Zhang | G06Q 30/02 | 705/14.66 |
| 2014/0082660 A1* | 3/2014 | Zhang | H04N 21/258 | 725/32 |
| 2014/0143043 A1* | 5/2014 | Wickramasuriya | H04N 21/41407 | 705/14.45 |
| 2014/0143803 A1* | 5/2014 | Narsimhan | H04N 5/44591 | 725/34 |
| 2014/0149221 A1* | 5/2014 | Rycyna, III | G06Q 30/0264 | 705/14.61 |
| 2014/0175161 A1* | 6/2014 | Camp | G06K 7/1095 | 235/375 |
| 2014/0181694 A1* | 6/2014 | Barman | G06Q 50/01 | 715/753 |
| 2014/0211699 A1* | 7/2014 | Zhou | H04W 48/12 | 370/329 |
| 2014/0355955 A1* | 12/2014 | Berger | H04L 67/20 | 386/248 |
| 2014/0365675 A1* | 12/2014 | Bhardwaj | H04L 65/60 | 709/231 |
| 2015/0025962 A1* | 1/2015 | Becket | G06Q 30/0277 | 705/14.48 |
| 2015/0348093 A1* | 12/2015 | Jiang | G06Q 30/0246 | 705/14.45 |
| 2015/0356612 A1* | 12/2015 | Mays | G06Q 30/0241 | 705/14.61 |

FOREIGN PATENT DOCUMENTS

| | | | | |
|---|---|---|---|---|
| EP | 2626823 A1 * | 8/2013 | | H04M 1/72572 |
| WO | 2015/157104 A1 | 10/2015 | | |
| WO | 2015/157104 A8 | 11/2015 | | |

OTHER PUBLICATIONS

Teichmann, "International Search Report and Written Opinion issued in International Application No. PCT/US2015/024232", dated Jun. 8, 2015, 9 pages.

Wittmann-Regis, "International Preliminary Report on Patentability issued in International Application No. PCT/US2015/024232", dated Oct. 20, 2016, 7 pages.

* cited by examiner

CUSTOMIZED LOYALTY NOTIFICATIONS

TECHNICAL FIELD

The present disclosure relates generally to location-based services on a user computing device, and more particularly to location-based loyalty notifications.

BACKGROUND

A mobile user computing device is a convenient device on which a user can store, select, and display loyalty cards. The mobile device may utilize an application via which the user can select loyalty cards to display. The mobile device may also be able to detect when a loyalty card is used in a transaction with a merchant system. Often, loyalty cards are organized on the mobile device in alphabetical order or in order of the most recent use. This may be inconvenient for users that store a greater number of loyalty cards on the mobile device due to the difficulty in finding the appropriate loyalty card.

Most conventional mobile user computing devices, such as smartphones, are capable of detecting a user location. Conventional technologies do not provide for a mobile user computing device storing the location where a loyalty card is used and suggesting the loyalty card the next time the mobile user computing device nears the location. Conventional technologies also do not provide for suggesting a loyalty card on a mobile user computing device when the mobile user computing device enters a location that has been associated by a server with a loyalty card based on aggregated data from a plurality of mobile user computing devices.

SUMMARY

In certain example aspects described herein, a computer-implemented method to associate a loyalty card with a location for suggestion by a user computing device is provided. In an example embodiment, the user accesses the account management system website via the user computing device and establishes a user account with the account management system. In an example embodiment, the user downloads a loyalty card application onto the user computing device whereby the user may access the user account. The loyalty card application receives one or more loyalty cards.

A loyalty card is associated with a merchant system location. In an example embodiment, the user enters the merchant system location, selects the loyalty card on the user computing device, and associates the loyalty card with the user computing device location via the loyalty card application. In another example embodiment, the user enters the merchant system location, the user computing device sends a wireless communication request, a merchant device receives the wireless communication request, and a network connection is established between the user device and the merchant device. In this example embodiment, the merchant device transmits a request for the user computing device to display the loyalty card, wherein the loyalty card application logs location data and associates the merchant system location with the loyalty card. In yet another example embodiment, the loyalty card application, upon detecting that the loyalty card has been scanned or used in a transaction with the merchant system, logs the current location and associates the merchant system location with the loyalty card. In certain other example embodiments, the account management system associates a class of loyalty card with a merchant system location based on aggregate data received from multiple user computing devices. In these embodiments, the loyalty card application communicates with the account management system and determines that the loyalty card belongs to this class of loyalty card and associates the merchant system location with the loyalty card.

The user configures loyalty card alert settings on the user computing device application. The user enters the merchant system location associated with the loyalty card. The user computing device location is detected. The loyalty card application suggests the loyalty card to the user according to the user-configured loyalty card alert settings.

In certain other example aspects described herein, a system and a computer program product to associate a loyalty card with a location for suggestion by a user computing device are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

The example embodiments described herein provide computer-implemented techniques for associating a loyalty card with a location for suggestion by a user computing device. In an example embodiment, a user establishes an account with an account management system and downloads a loyalty card application onto a user computing device that communicates with the account management system. One or more loyalty cards are uploaded on the loyalty card application. A loyalty card is associated with a merchant system location either in response to the user manually associating the merchant system location with the loyalty card, in response to the loyalty card application detecting that a loyalty card has been scanned or used at a merchant system location, or in response to the account management system associating the loyalty card with the merchant system location via aggregate data received from multiple user computing devices. When the user enters the merchant system location, the loyalty card application detects the user computing device location and suggests the loyalty card to the user based on the association of the loyalty card with the location.

In an example embodiment, the user accesses the account management system website via the user computing device and establishes a user account with the account management system. In an example embodiment, the user downloads a loyalty card application onto the user computing device whereby the user may access the user account. In an example embodiment, the loyalty card application communicates with the account management system and stores loyalty cards for the user on the user computing device. The loyalty card application receives one or more loyalty cards. For example, a loyalty card may be associated with a merchant system. In another example, a loyalty card may be associated with a non-merchant service, such as a public library. In an example embodiment, the loyalty cards are downloaded from one or more websites by the user, received from one or more merchant devices over a network connection, received via email or text message, or otherwise received on the user computing device by the loyalty card application.

A loyalty card is associated with a merchant system location. In an example embodiment, the user enters the merchant system location, selects the loyalty card on the user computing device, and associates the loyalty card with the user computing device location via the loyalty card application. For example, the user computing device logs the current location using a global positioning system ("GPS") system or a known location of a network device with which the user computing device has established a network connection. In this example, the loyalty card application associates the loyalty card with the location stored by the user computing device. In another example embodiment, the user enters the merchant system location, the user computing device sends a wireless communication request, a merchant system device receives the wireless communication request, and a network connection is established between the user computing device and the merchant device. In this example embodiment, the merchant device transmits a request for the user computing device to display the loyalty card. In yet another example embodiment, the application, upon detecting that the loyalty card has been scanned or used in a transaction with the merchant system, logs the current location and associates the merchant system location with the loyalty card. In this example embodiment, the user may need to configure the settings of the loyalty card application to allow for automatic association of location data with loyalty cards. In certain other example embodiments, the account management system associates a class of loyalty card with a merchant system location based on aggregate data received from multiple user computing devices. In these embodiments, the loyalty card application communicates with the account management system and determines that the loyalty card belongs to this class of loyalty card and associates the merchant system location with the loyalty card.

The user configures loyalty card alert settings on the user computing device loyalty card application. For example, the user may configure the loyalty card application to only suggest loyalty cards at certain times. In another example, the user may configure the loyalty card application to limit the loyalty card suggestion to a certain proximity from the stored location associated with the loyalty card. The user nears or enters the merchant system location associated with the loyalty card. The user computing device location is detected. In an example embodiment, the user computing device periodically logs its location and communicates with the loyalty card application. In another example embodiment, a merchant device transmits a signal that is detected by the user computing device. In this example embodiment, the loyalty card application associates the signal with the merchant system location. The loyalty card application suggests the loyalty card to the user according to the user-configured loyalty card alert settings. For example, the loyalty card application displays the loyalty card on the user interface of the user computing device. In another example, a user interface object associated with the loyalty card is displayed at the top of a list of user interface objects associated with loyalty cards. In this example, the user may actuate the user interface object associated with the loyalty card to display the loyalty card on the user interface of the user computing device.

Example System Architecture

Turning now to the drawings, in which like numerals indicate like (but not necessarily identical) elements throughout the figures, example embodiments are described in detail.

Figure 1:
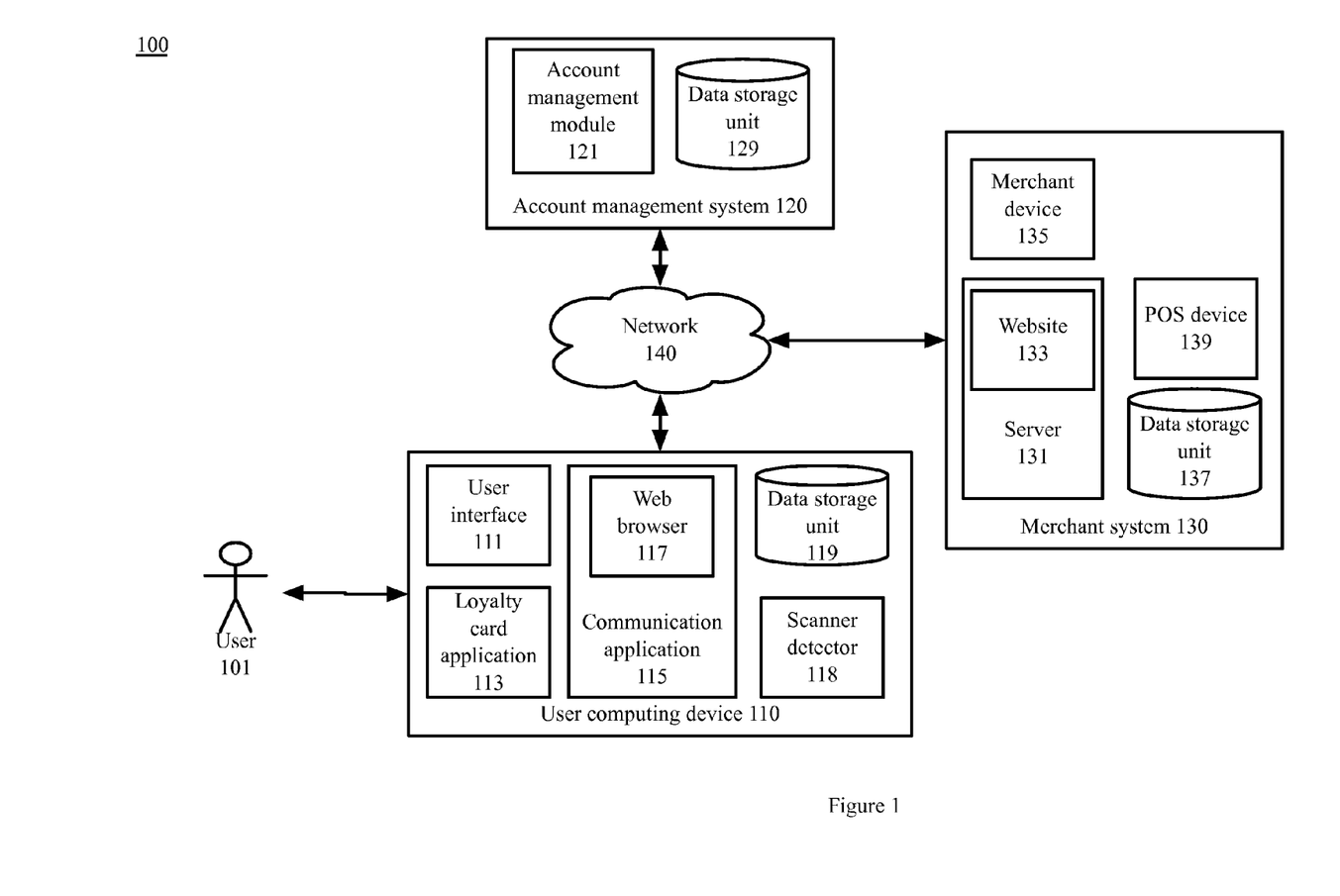
FIG. 1 is a block diagram depicting a system for associating a loyalty card with a location for suggestion by a user computing device, in accordance with certain example embodiments.

FIG. 1 is a block diagram depicting a system 100 for associating a loyalty card with a location for suggestion by a user computing device 110, in accordance with certain example embodiments. As depicted in FIG. 1, the system 100 includes network computing devices 110, 120, and 130 that are configured to communicate with one another via one or more networks 140. In some embodiments, a user associated with a device must install an application and/or make a feature selection to obtain the benefits of the techniques described herein.

In example embodiments, the network 140 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 120, and 130 includes a device having a communication module capable of transmitting and receiving data over the network 140. For example, each network computing device 110, 120 and 130 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 120, and 130 are operated by users 101, account management system operators, and merchant system operators, respectively.

An example user computing device 110 comprises a user interface 111, a loyalty card application 113, a communication application 115, a web browser 117, a scanner detector 118, and a data storage unit 119. In an example embodiment, the user interface 111 enables the user 101 to interact with the loyalty card application 113 and/or the web browser 117. For example, the user interface 111 may be a touch screen, a voice-based interface or any other interface that allows the user 101 to provide input and receive output from an application or module on the user computing device 110. In an example embodiment, the user 101 interacts with the loyalty card application 113 using the user interface 111 to upload one or more loyalty cards to the user computing device 110. In another example embodiment selects a loyalty card using the user interface 111. In an example embodiment, the user 101, using the user interface 111, configures the loyalty card application 113 alert settings for suggesting loyalty cards associated with locations associated with one or more merchant systems 130. In an example embodiment, a merchant operator scans with a laser scanner a loyalty card comprising a barcode displayed by the user interface 111.

In an example embodiment, the loyalty card application 113 is a program, function, routine, applet, or similar entity that exists on and performs its operations on the user computing device 110. In certain example embodiments, the user 101 must install the loyalty card application 113 and/or make a feature selection on the user computing device 110 to obtain the benefits of the techniques described herein. In an example embodiment, the user 101 may access the loyalty card application 113 on the user computing device 110 via a user interface 111. In an example embodiment, a user 101 signs in to the loyalty card application 113, which enables the loyalty card application 113 and/or account management system 120 to log the user device 110 location data. In another example embodiment, the loyalty card application 113 enables the user 101 to access the merchant system 130 website 133 to download a loyalty card associated with a merchant system 130. In an example embodiment, the loyalty card application 113 maintains and organizes loyalty cards on the user computing device 110. In another example embodiment, the loyalty card application 113 communicates with the account management system 120, which maintains and organizes the loyalty cards. In an example embodiment, the loyalty card application 113 logs user computing device 110 location data. In an example embodiment, the loyalty card application 113 communicates with a scanner detector 118 to detect when a loyalty card has been used in a transaction with a merchant system 130. A loyalty card may comprise a discount card, a membership card, an identification card, a rewards program card, a transit card, or a charge card. A loyalty card may enable a user to access services from a merchant system 130 or may be used in a transaction with the merchant system 130. In an example embodiment, a loyalty card may comprise a barcode that can be scanned by a merchant system 130 POS device 139 or comprise a code that can be entered manually into the POS device 139.

In an example embodiment, the user 101 can use a communication application 115, such as a web browser 117 application or a stand-alone loyalty card application 113, to view, download, upload, or otherwise access documents or web pages via a distributed network 140.

In an example embodiment, the communication application 115 can interact with web servers or other computing devices connected to the network 140, including the user computing device 110 and the web server 117 of the merchant system 130.

In an example embodiment, the web browser 117 can enable the user 101 to interact with web pages using the user computing device 110. In an example embodiment, the user 101 accesses the web browser 117 to sign in to a user account to enable the account management system 120 to log the user device 110 location data. In an example embodiment, the user 101 accesses the merchant system 130 website 131 using the web browser 117. In an example embodiment, the user 101 accesses a web browser 117 application to upload one or more loyalty cards. In certain example embodiments, actions described herein as performed by the loyalty card application 113 may also be performed by a web browser 117 application.

In an example embodiment, the scanner detector 118 detects when a merchant point of sale ("POS") terminal 139 scans a loyalty card on the user computing device 110. In an example embodiment, the scanner detector 118 detects an output of the merchant POS terminal 139. For example, the scanner detector 118 is a light detector and detects a laser scanner. In another example, the scanner detector 118 is a sound detector and detects a sound output of the POS terminal 139 associated with a successful scan of a loyalty card. In another example embodiment, the scanner detector 118 detects near field communication ("NFC") with the merchant system 130 and/or the transmission of loyalty card information via an NFC network 140 from the user computing device 110 to the merchant system 130. In yet another example embodiment, the scanner detector 118 detects Wi-Fi or Bluetooth communication with the merchant system 130 and/or the transmission of loyalty card information via a Wi-Fi or Bluetooth network 140 from the user computing device 110 to the merchant system 130. In an example embodiment, the scanner detector 118 communicates with the loyalty card application 113 and/or the account management system 120. In an example embodiment, the scanner detector 118 detects that a loyalty card has been scanned and notifies the loyalty card application 113, which requests location data from the user computing device 110, logs the location data, and associates the location data with the scanned loyalty card. In other example embodiments, the merchant system 139 communicates with the loyalty card application 113 to notify the loyalty card application 113 that the loyalty card has been successfully scanned or otherwise used in a transaction. In yet another example embodiment, the loyalty card application 113 detects that a loyalty card has been open for a certain amount of time and determines that the loyalty card has been used in a transaction.

In an example embodiment, the data storage unit 119 comprises a local or remote data storage structure accessible to the user computing device 110 suitable for storing information. In an example embodiment, the data storage unit 119 stores encrypted information, such as HTML5 local storage. In an example embodiment, the data storage unit 119 stores one or more loyalty cards and is accessible by the loyalty card application 113.

An example account management system 120 comprises an account management module 121 and a data storage unit 129. In an example embodiment, the account management system 120 communicates with the user device 110 via the account management module 121. In an example embodiment, user device 110 comprises a loyalty card application 113 distributed by the account management system 120 that enables the user 101 to access a user account managed by the account management system 120. In another example embodiment, the user 101 accesses the user account via the web browser 117 of the user device 110. In an example embodiment, the account management module 121 is capable of determining when the user 101 is signed in to the user account. For example, a user sign in may be required by the account management system 120 for the loyalty card application 113 to log user computing device 110 location data.

In an example embodiment, the data storage unit 129 comprises a local or remote data storage structure accessible to the account management system 120 suitable for storing information. In an example embodiment, the data storage unit 129 stores encrypted information, such as HTML5 local storage. In an example embodiment, the data storage unit 129 stores one or more loyalty cards. In an example embodiment, the data storage unit 129 is accessible by the loyalty card application 113 over the network 140.

An example merchant system 130 comprises a server 131, a website 133, a network device 135, a data storage unit 137, and a POS terminal 139.

In an example embodiment, the web server 131 provides the content that the user 101 accesses through the web browser 117 on the user computing device 110, including but not limited to html documents, images, style sheets, and scripts. In an example embodiment, the web server 131 supports the merchant system's 130 web site 133.

In an example embodiment, the website 133 communicates with the web browser 117 via the communication application 115. In an example embodiment, the loyalty card application 113 on the user computing device 110 receives one or more loyalty cards associated with the merchant system 130 from the merchant website 133. In an example embodiment, the user 101 selects the one or more loyalty cards on the website 133 and downloads the one or more loyalty cards onto the user computing device 110.

In an example embodiment, the data storage unit 137 comprises a local or remote data storage structure accessible to the merchant system 130 suitable for storing information. In an example embodiment, the data storage unit 137 stores encrypted information, such as HTML5 local storage.

In an example embodiment, the merchant device 135 is a network device at a physical location of a merchant system 130, for example, a Wi-Fi network device. In an example embodiment, the merchant device 137 receives a wireless communication request from the user device 110 as the user device 110 requests to establish a network 140 connection. In an example embodiment, the merchant device 135 transmits one or more loyalty cards to a user computing device 110.

In an example embodiment, the POS terminal 139 is located at a merchant system 130 location. In an example embodiment, the POS terminal 139 scans or otherwise reads a loyalty card on the user computing device 110. In an example embodiment, when the POS terminal 139 scans the loyalty card, the scanner detector 118 detects that the loyalty card was scanned. For example, the scanner detector 118 is a light detector and/or a sound detector configured to detect merchant POS terminal 139 scanners.

It will be appreciated that the network connections shown are example and other means of establishing a communications link between the computers and devices can be used. Moreover, those having ordinary skill in the art having the benefit of the present disclosure will appreciate that the user computing device 110, the account management system 120, and the merchant system 130 illustrated in FIG. 1 can have any of several other suitable computer system configurations. For example, a user computing device 110 embodied as a mobile phone or handheld computer may or may not include all the components described above.

Example Processes

The example methods illustrated in FIGS. 2-5 are described hereinafter with respect to the components of the example operating environment 100. The example methods of FIGS. 2-5 may also be performed with other systems and in other environments.

Figure 2:
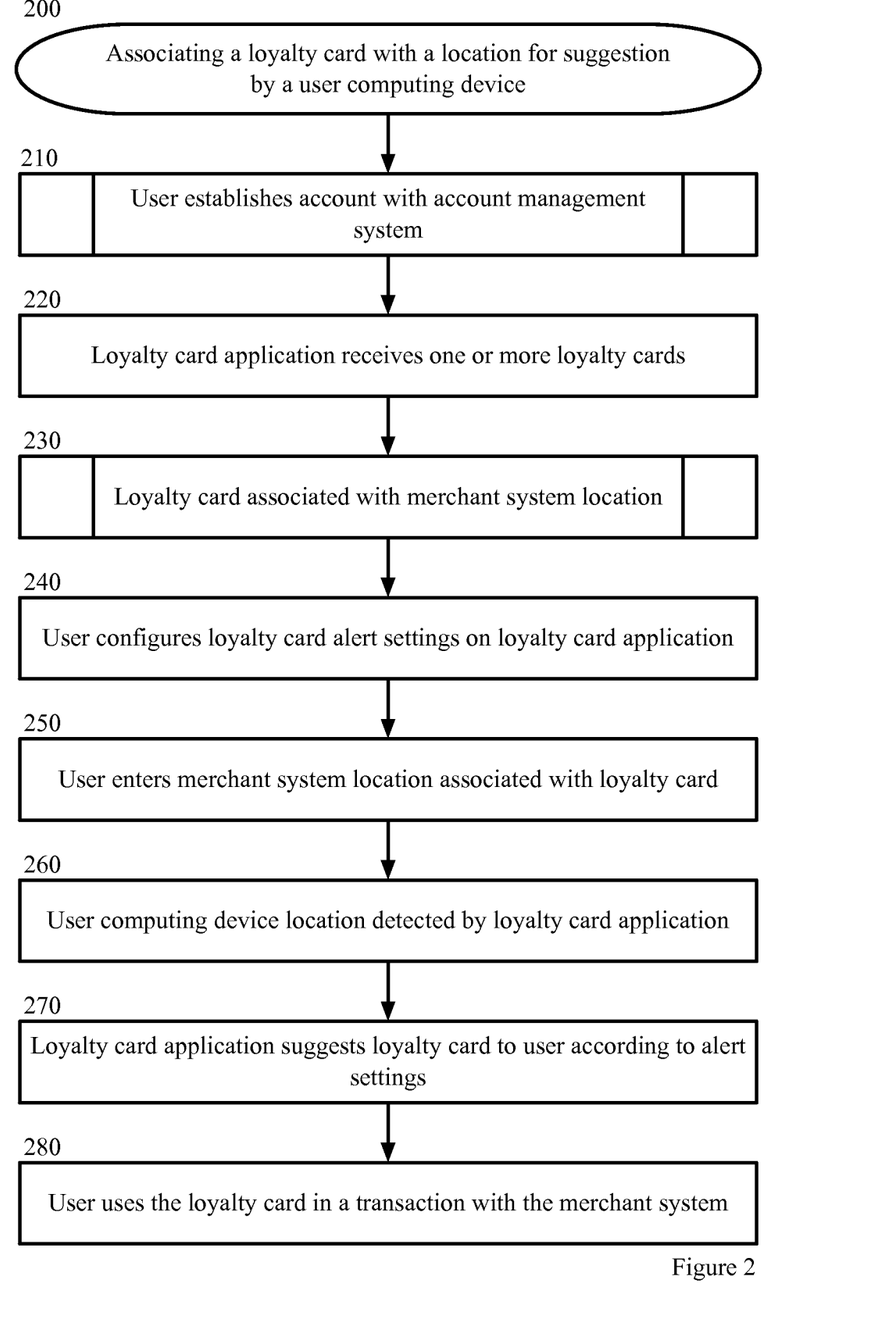
FIG. 2 is a block flow diagram depicting a method for associating a loyalty card with a location for suggestion by a user computing device, in accordance with certain example embodiments.

FIG. 2 is a block diagram depicting a method 200 for associating a loyalty card with a location for suggestion by a user computing device 110, in accordance with certain example embodiments. The method 200 is described with reference to the components illustrated in FIG. 1.

In block 210, the user 101 establishes an account with the account management system 120. The method for establishing a user account with an account management system 120 is described in more detail hereinafter with reference to the method described in FIG. 3.

Figure 3:
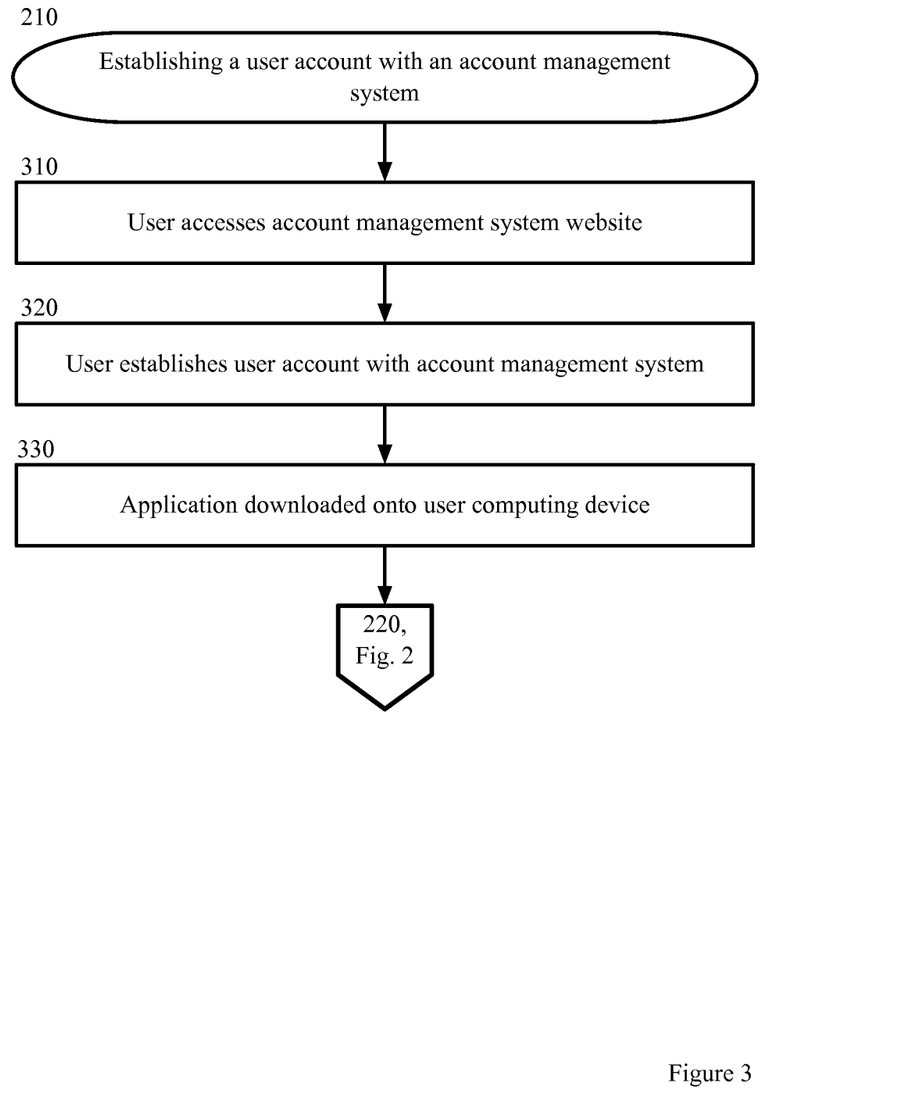
FIG. 3 is a block flow diagram depicting a method for establishing a user account with an account management system, in accordance with certain example embodiments.

FIG. 3 is a block diagram depicting a method 210 for establishing a user account with an account management system 120, in accordance with certain example embodiments. The method 210 is described with reference to the components illustrated in FIG. 1.

In block 310, the user 101 accesses the account management system 120 website. In an example embodiment, the user 101 accesses the account management system 120 website via the web browser 117 of the user computing device 110. For example, the user 101 enters the website address in the address bar of the web browser 117 to access the website. In another example embodiment, the user 101 accesses the account management system 120 website using an application resident on the user computing device 110. For example, the user 101 selects an application on the user computing device 110 that connects the user 101 to the account management system 120 website.

In block 320, the user 101 establishes a user account with the account management system 120. In an example embodiment, the user 101 registers a username and a password associated with the user account to use to sign in to the user account. In an example embodiment, the user account is associated with a service, such as a digital wallet, an email service, a messaging service, a gaming service, a mapping service, or other suitable service. In another example embodiment, the user account is associated with multiple services.

In block 330, a loyalty card application 113 is downloaded onto the user computing device 110. In an example embodiment, the loyalty card application 113 is associated with the user 101 account and allows the user 101 to access the user account and/or services provided by the account management system 120 for the user 101 associated with the user account. In another example embodiment, the user 101 downloads the loyalty card application 113 onto the user computing device 110 before establishing an account with the account management system 120. In this example embodiment, the loyalty card application 113 may facilitate the process of establishing a user account with the account management system 120 via the user computing device 110. In an example embodiment, the loyalty card application 113 is an application wherein the user 101 stores one or more loyalty cards on the user computing device 110. In an example embodiment, the user 101 views and selects loyalty cards for display on the user computing device 110 by interacting with the loyalty card application 113 via the user interface 111. In an example embodiment, a loyalty card can be read by a merchant point of sale ("POS") terminal 139 from the user computing device 110. For example, a laser scanner operated by a merchant can read a loyalty card barcode from the user interface 111 of the user computing device 110. In another example, the loyalty card can be received from the user computing device 110 by the merchant website 113 via a network 140. In yet another example embodiment, a merchant system 130 POS device 139 operator reads information from the loyalty card on the user computing device 110 and enters the information manually into the POS device 139. In other example embodiments, the merchant system 130 receives information from the loyalty card on the user computing device 110 via an NFC, Bluetooth, or Wi-Fi network 140. In an example embodiment, the loyalty card application 113 is downloaded from the account management system 120 website. In other example embodiments, the loyalty card application 113 is received onto the user computing device 110 via email, text message, or by other means from the account management system 120. In certain example embodiments, an loyalty card application 113 is not downloaded onto the user computing device 110. For example, the user 101 interacts with a web browser 117 application or interacts with the user account via the web browser 117 instead of interacting with an loyalty card application 113 resident on the user computing device 110.

Returning to FIG. 2, in block 220, the loyalty card application 113 on the user computing device 110 receives one or more loyalty cards. In an example embodiment, the one or more loyalty cards are received on the user computing device 110 loyalty card application 113 via email, text message, the web browser 117, capture of an image using a camera module on the user computing device 110, manual input via the user interface, or by another appropriate method. In an example embodiment, the user 101 uploads the one or more loyalty cards to the loyalty card application 113. For example, the user 101 receives one or more loyalty cards via email on the user computing device 110, selects the one or more loyalty cards, and adds them to the loyalty card application 113. In this example, the loyalty card application 113 may store account numbers, merchant names, bar codes, QR codes, or any other information associated with the one or more loyalty cards. In another example embodiment, the loyalty card application 113, the account management system 120, one or more merchant systems 130 or another entity suggests one or more loyalty cards to the user 101 to upload to the loyalty card application 113. For example, the account management system 120 suggests a loyalty card to the user 101 and asks the user 101 if he wants to upload the loyalty card to the loyalty card application 113. In this example, the user 101 may actuate an object on the user interface 111 to upload the loyalty card to the loyalty card application 113. In yet another example embodiment, the loyalty card application 113 receives one or more loyalty cards from a merchant device 135 over the network 140. For example, the user 101 enters a merchant system 130 location, a network connection is established between the user computing device 110 and the merchant device 135, and the merchant device 135 transmits a loyalty card to the loyalty card application 113 on the user computing device 110.

In other example embodiments, the loyalty card application 113 does not receive or store loyalty cards. In certain example embodiments, actions herein described as performed by the loyalty card application 113 may be performed by the account management system 120. In certain example embodiments, actions herein described as performed by the account management system 120 may be performed by the loyalty card application 113. In an example embodiment, the account management system 120 receives the one or more loyalty cards. In this example embodiment, the loyalty card application 113 communicates with the account management system 120 for the user 101 to access the loyalty cards via the user computing device 110. In an example embodiment, the user 101 uploads the one or more loyalty cards to the user account managed by the account management system 120.

In an example embodiment, the one or more loyalty cards comprise alphanumeric codes, QR codes, barcodes, or other information associated with one or more discounts, coupons, rewards programs, or memberships. In an example embodiment, each loyalty card received by the user computing device 110 loyalty card application 113 can be used more than once by the user 101. For example, a loyalty card may comprise a membership card used to access services provided by an organization in which the user 101 maintains a membership. In another example, a loyalty card gives a user 101 points with each use such that the user 101 can redeem those points for discounts or award items. In another example, a loyalty card allows a user 101 to receive a discount on a certain item from a merchant. In an example embodiment, one or more loyalty cards are readable by a merchant POS terminal 139. In another example embodiment, one or more loyalty cards are not readable by a merchant POS terminal 139 but comprise information that can be manually entered into the POS terminal 139 by a merchant operator to obtain the benefits of the one or more loyalty cards. For example, a loyalty card comprises an alphanumeric discount code that the merchant POS terminal 139 operator can enter into the POS terminal 139 to obtain the discount for the user 101.

In block 230, a loyalty card is associated with a merchant system 130 location. The method for associating a loyalty card on a user computing device 110 with a merchant system 130 location is described in more detail hereinafter with reference to the methods described in FIGS. 4 and 5.

Figure 4:
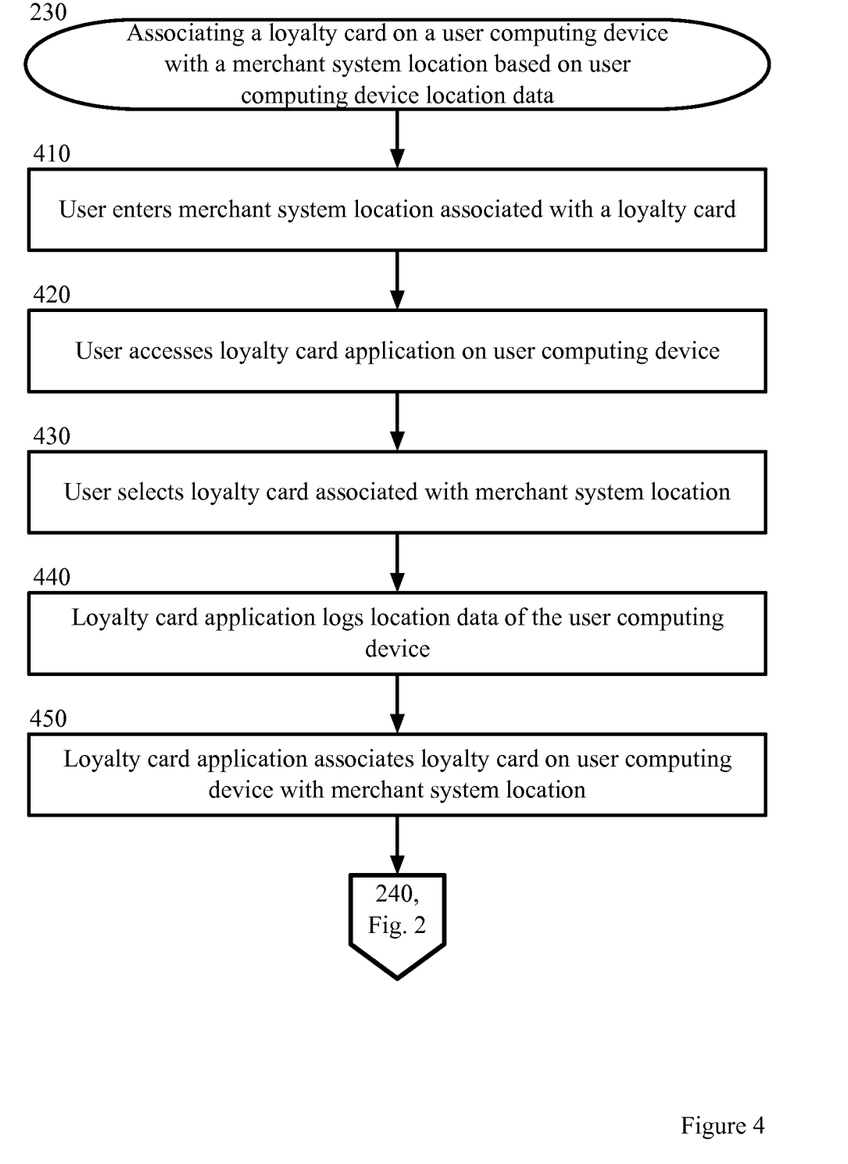
FIG. 4 is a block flow diagram depicting a method for associating a loyalty card on a user computing device with a merchant system location based on user computing device location data, in accordance with certain example embodiments.

FIG. 4 is a block diagram depicting a method 230 for associating a loyalty card on a user computing device 110 with a merchant system 130 location based on user computing device 110 location data, in accordance with certain example embodiments. The method 230 is described with reference to the components illustrated in FIG. 1.

In block 410, the user 101 enters a merchant system 130 location associated with a loyalty card. In an example embodiment, the merchant system 130 comprises one or more physical locations. For example, the user 101 has associated a store savings card with the user computing device 110 and enters a store location. In another example, the user 101 enters a public library branch with the user computing device 110 on which a library card is saved. In yet another example, the user 101 enters a fitness gym with the user computing device 110 on which a gym membership card is saved.

In block 420, the user 101 accesses the loyalty card application 113 on the user computing device 110. In an example embodiment, the user 101 selects the loyalty card application 113 on the user computing device 110 using the user interface 111. For example, the user 101 accesses the loyalty card application 113 by touching an icon on a touchscreen interface of the user computing device 110. In another example embodiment, the user 101 accesses a web browser 117 application that communicates with and is managed by the account management system 120. In an example embodiment, the user 101 signs in to the loyalty card application 113 and/or the user account associated with the account management system 120.

In block 430, the user 101 selects a loyalty card associated with a merchant system 130 location. In an example embodiment, the user 101 navigates a list of loyalty cards on the loyalty card application 113 and selects a loyalty card corresponding to the merchant system 130 location. For example, the loyalty card application 113 organizes the list of loyalty cards in alphabetical order. In another example, the loyalty card application 113 organizes the list of loyalty cards in chronological order according to when the loyalty card application 113 receives the loyalty cards. In another example embodiment, the user computing device 110 receives a loyalty card associated with the merchant system 130 location at the merchant system 130 location. For example, the merchant device 135 transmits a loyalty card to the user computing device 110 at the merchant system 130 location. In another example, the user 101 accesses the network 140 on the user computing device 110 via an Internet connection provided by the merchant system 130. In this example, the user computing device 110 is directed to a merchant system 130 website 133 where a loyalty card is suggested to the user computing device 110. In this example, the user 101 may actuate a user interface 111 object to download the loyalty card onto the user computing device 110 at the merchant system 130 location. In another example embodiment, the user 101 enters the merchant system 130 location, the user computing device 110 sends a wireless communication request, a merchant device 135 receives the wireless communication request, and a network 140 connection is established between the user computing device 110 and the merchant device 135. In this example embodiment, the merchant device 135 transmits a request for the user computing device 110 to display the loyalty card.

In block 440, the loyalty card application 113 logs location data of the user computing device 110. In an example embodiment, the user 101 enables the loyalty card application 113 to log the location data based on a user 101 action on the user computing device 110. For example, the user 101 signs in to the user account associated with the account management system 120 and agrees to submit location data. In another example, when the user 101 signs in to the loyalty card application 113, the user 101 agrees to submit location data. In another example embodiment, the loyalty card application 113 requests user 101 consent to log the location data. For example, the loyalty card application 113 presents the user 101 with a notice reading, "would you like to activate location based services?" and the user 101 actuates a user interface 111 object to consent. In another example embodiment, the loyalty card application 113 does not request user consent to log location data. In an example embodiment, the loyalty card application 113 or the user computing device 110 transmits the location data to the account management system 120 or the account management system 120 otherwise receives the location data. In an example embodiment, the loyalty card application 113 logs location data when a scanner detector 118 notifies the loyalty card application 113 that a selected loyalty card has been scanned by a POS terminal 139. For example, the scanner detector 118 comprises a light detector and/or sound detector that is capable of detecting when the POS terminal 139 has scanned or otherwise read the loyalty card. In another example embodiment, the merchant system 139 communicates with the loyalty card application 113 to notify the loyalty card application 113 that the loyalty card has been successfully scanned or otherwise used in a transaction. In this example embodiment, the loyalty card application logs location data in response to receiving notification that the loyalty card has been used in the transaction. In yet another example embodiment, the loyalty card application 113 detects that a loyalty card has been open for a certain amount of time, determines that the loyalty card has been used in a transaction, and logs the location data.

In an example embodiment, the user computing device 110 is capable of receiving an input from the global positioning system ("GPS") or other satellite-based positioning system. In an example embodiment, the loyalty card application 113 utilizes input received from the GPS technology on the user computing device 110 to log the approximate longitude and latitude of the user computing device 110. In another example embodiment, the loyalty card application 113 uses an input from another satellite-based positioning system received on the user computing device 110 to log the location data. In yet another example embodiment, the user computing device 110 calculates a distance of the user computing device 110 from the nearest radio towers or cell towers to determine its position. In yet another example embodiment, the loyalty card application 113 determines the location of the user computing device 110 when a network connection is established with a merchant device 135 having a known location.

In block 450, the loyalty card application 113 associates the loyalty card on the user computing device 110 with the merchant system 130 location. In an example embodiment, the loyalty card application 113 classifies the user computing device 110 location data stored by the loyalty card application 113 as the merchant system 130 location and associates the merchant system 130 location with the loyalty card. In another example embodiment, the account management system 120 associates the loyalty card with the user computing device 110 location data stored by the loyalty card application 113 and communicates the association to the loyalty card application 113. In an example embodiment, the loyalty card application 113 associates the loyalty card by creating an alert within the loyalty card application 113 that is activated when the user 101 enters the merchant system 130 location that associates the loyalty card with the merchant system 130 location. In an example embodiment, the user 101 configures the settings of the loyalty card application 113 to allow for automatic association of location data with loyalty cards. In another example embodiment, the loyalty card application 113 requests user 101 permission to associate the loyalty card with the merchant system 130 location. In yet another example embodiment, the default setting for the loyalty card application 113 is to automatically associate loyalty cards with merchant system 130 locations unless the user 101 otherwise configures the loyalty card application 113 settings.

Figure 5:
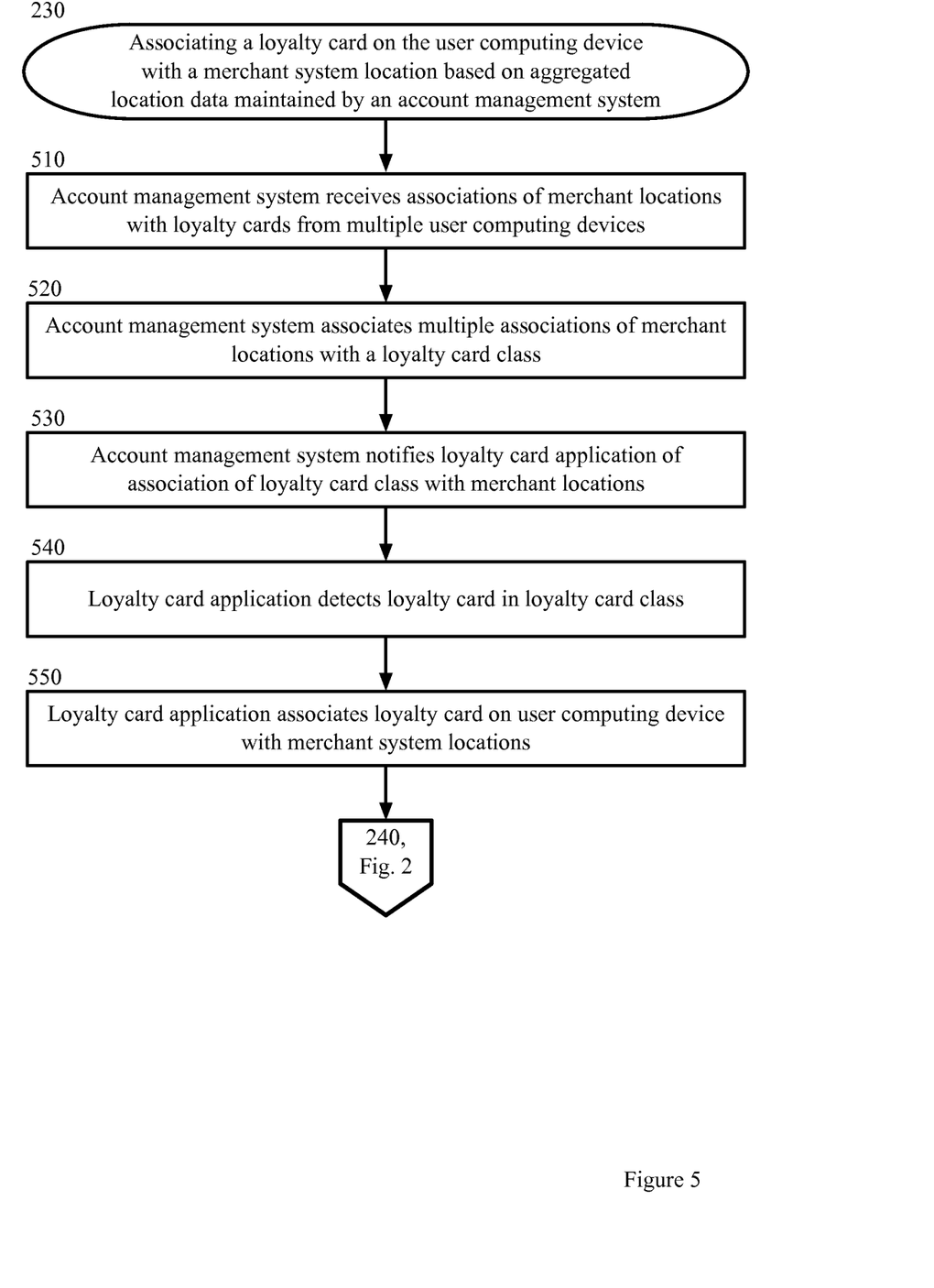
FIG. 5 is a block flow diagram depicting a method for associating a loyalty card on a user computing device with a merchant system location based on aggregated location data maintained by an account management system, in accordance with certain example embodiments.

FIG. 5 is a block diagram depicting a method 230 for associating a loyalty card on the user computing device 110 with a merchant system 130 location based on aggregated location data maintained by the account management system 120, in accordance with certain example embodiments. The method 230 is described with reference to the components illustrated in FIG. 1.

In block 510, the account management system 120 receives an association of merchant system 130 locations with loyalty cards from a plurality of user computing devices 110. In an example embodiment, multiple users 101 have user accounts managed by the account management system 120. In this example embodiment, the account management system 120 communicates with each of the plurality of user computing devices 110. In this example embodiment, each of the plurality of user computing devices 110 comprises a loyalty card application 113, which receives one or more loyalty cards. In an example embodiment, the loyalty card application 113 of one or more of the plurality of user computing devices 110 associates a merchant system 130 location with a loyalty card. For example, for each of the one or more of the plurality of user computing devices 110, a user 101 directs the loyalty card application 113 to log the user computing device 110 location data and associate the location data to a loyalty card. In another example, for each of the one or more of the plurality of user computing devices 110, the loyalty card application 113 logs the user computing device 110 location data in response to detecting that a loyalty card has been used at the merchant system 130 location. In this example, the loyalty card application 113 may detect that a loyalty card has been scanned via a scanner detector 118. In an example embodiment, the one or more of the plurality of user computing devices 110 communicate one or more associations of loyalty cards with merchant system 130 locations to the account management system 120.

In block 520, the account management system 120 associates multiple associations of merchant system 130 locations with a loyalty card class. In an example embodiment, the multiple associations are received from the loyalty card applications 113 of the plurality of user computing devices 110. In this example embodiment, the account management system 120 may perform the association in response to receiving a threshold number of associations from the loyalty card applications 113 of the plurality of user computing devices 110. For example, when the account management system 120 receives ten associations from individual user computing devices 110 of a merchant system 130 location with a loyalty card class, the account management system 120 associates the multiple associations. In an example embodiment, to associate the multiple associations of merchant system 130 locations with a loyalty card class, the account management system 120 detects multiple associations of merchant system 130 locations with a loyalty card class. In an example embodiment, a merchant system 130 comprises multiple locations and distributes a common type of loyalty card to one or more user computing devices 110. In this example embodiment, the account management system 120 determines, from the received associations, that the merchant system's 130 multiple locations are associated with the common type of loyalty card. For example, a public library comprises several branches but issues a common type of library card to all of its patrons. In this example, the account management system 120 determines that this class of library card has been associated with the several branch locations by a plurality of user computing devices 110. In an example embodiment, a loyalty card class comprises loyalty cards having the same characteristics and/or the same merchant system 130 name. For example, a public library merchant system 130 comprises multiple locations but issues library cards having an identical format to all of the library's clients for use in one or more of the multiple locations. In this example, the library cards comprise a loyalty card class.

In other example embodiments, the account management system 120 communicates with the merchant system 130 to associate one or more merchant system 130 locations with a loyalty card class. In an example embodiment, the merchant system 130 transmits the addresses, GPS coordinates, and/or other location information associated with one or more merchant system 130 locations and a loyalty card class description. In this example embodiment, the account management system 120 associates the one or more merchant system 130 locations with the loyalty card class. In this example embodiment, the loyalty card class description enables the account management system 120 and/or user computing device 110 to identify a loyalty card associated with the loyalty card class based on the characteristics identified in the loyalty card class description.

In block 530, the account management system 120 notifies the loyalty card application 113 on the user computing device 110 of the association of the loyalty card class with the merchant system 130 locations. In an example embodiment, the loyalty card application 113 receives the notification and searches for one or more loyalty cards in the loyalty card class. For example, the loyalty card application 113 may receive a description of the characteristics of the loyalty card class and/or merchant name associated with the loyalty card class to enable the application 113 to detect a loyalty card associated with the loyalty card class.

In block 540, the loyalty card application 113 detects a loyalty card in the loyalty card class. In an example embodiment, the loyalty card application 113 periodically scans loyalty cards residing on the user computing device 110 to detect whether the loyalty cards belong to an identified class of loyalty cards associated with one or more merchant system 130 locations. In an example embodiment, the loyalty card application 113 identifies a merchant name and/or characteristics of loyalty cards residing on the user computing device 110 to identify a loyalty card in a loyalty card class. For example, a library merchant system 130 comprising multiple branches issues library cards to members for use at the multiple branches. In this example, the library merchant system 130 may issue library cards comprising the merchant system 130 name "County X Public Library." In this example, the account management system 120 may identify the loyalty card as belonging to a "County X Public Library" loyalty card class.

In block 550, the loyalty card application 113 associates the loyalty card on the user computing device 110 with the merchant system 130 locations. In an example embodiment, when the loyalty card application 113 detects a loyalty card in an identified loyalty card class associated with one or more merchant system 130 locations, the loyalty card application 113 associates the loyalty card with location data for one or more merchant system 130 locations. In this example embodiment, the loyalty card application 113 is alerted when the user computing device 110 enters an associated merchant system 130 location.

Returning to FIG. 2, in block 240, the user 101 configures loyalty card alert settings on the user computing device 110 loyalty card application 113. In an example embodiment, the user 101 configures the loyalty card application 113 so that the loyalty card application 113 suggests a loyalty card associated with a merchant system 130 location when the user 101 enters the merchant system 130 location with the user computing device 110. In another example embodiment, the loyalty card application 113 can be configured to suggest the loyalty card when the user 101 nears the merchant system 130 location with the user computing device 110. In yet another example embodiment, the user 101 configures the loyalty card application 113 to suggest the loyalty card only at certain times. For example, the user 101 commutes by train and is accustomed to taking the train at 6:30 a.m. to work and 4:30 p.m. to return home from work. In this example, the user 101 may configure the loyalty card application 113 to suggest a loyalty card associated with the transit system only between the hours of 6:00 a.m.-7:00 a.m. and 4:00 p.m.-5:00 p.m. In this example, the user 101 may configure the loyalty card application 113 alert settings to suggest the loyalty card during the desired hours as the user 101 nears a train station associated with the transit system. This configuration may be useful to the user 101 because the user 101 may pass by the train station at other times of the day and have no intent to use the loyalty card and may be inconvenienced by the suggestion of the loyalty card at inappropriate times of the day.

In block 250, the user 101 enters a merchant system 130 location associated with the loyalty card. In an example embodiment, the user 101 enters the location corresponding to the user computing device 110 location data associated with the merchant system 130 location. In an example embodiment, when the loyalty card application 113 considers the user computing device 110 to have entered the merchant system 130 location is determined by the user-configured loyalty card application 113 settings. For example, the user 101 may configure the loyalty card application 113 to suggest a loyalty card when the user 101 is within 100 yards of the merchant system 130 location.

In block 260, the user computing device 110 location is detected by the loyalty card application 113. In an example embodiment, the loyalty card application 113 periodically requests the current location of the user computing device 110. In an example embodiment, the loyalty card application 113 detects that the user computing device 110 location is associated with one or more loyalty cards resident on the user computing device 110. In another example embodiment, the account management system 120 detects the user computing device 110 location. For example, the user computing device 110 periodically transmits the current location of the user computing device 110 to the account management system 120. In this example embodiment, the account management system 120 detects that the user computing device 110 location is associated with one or more loyalty cards resident on the user computing device 110 or saved on the user account managed by the account management system 120.

In block 270, the user computing device 110 loyalty card application 113 suggests the loyalty card to the user 101 according to the alert settings. For example the alert settings comprise time periods during which the loyalty card application 113 may suggest or not suggest the loyalty card. In an example embodiment, the loyalty card application 113 suggests the loyalty card by displaying the loyalty card on the user interface 111. In another example embodiment, the loyalty card application 113 moves the loyalty card name to a prominent position in a list of loyalty card names. For example, the loyalty card application 113 moves the loyalty card name to the top of a loyalty card name list. In this example, the user 101 may select the loyalty card name from the list to view the loyalty card. In another example, loyalty card application 113 displays a shortcut to the loyalty card in a notification bar. In this example, the user 101 may select the shortcut by actuating a user interface 111 object to view the loyalty card on the user computing device 110.

In block 280, the user 101 uses the loyalty card for a transaction with the merchant system 130. For example, the user 101 arrives at "County X Public Library," the loyalty card application 113 suggests a County X Public Library card to the user 101 on the user computing device 110, and the library card is displayed on the user interface 111. In this example, the user 101 presents the County X Public Library card to a librarian at the County X Public Library to check out one or more library books. In this example, the librarian scans the library card barcode on the user computing device 110 via a library POS terminal 139 and the user 101 is granted permission to check out the one or more library books.

Other Example Embodiments

Figure 6:
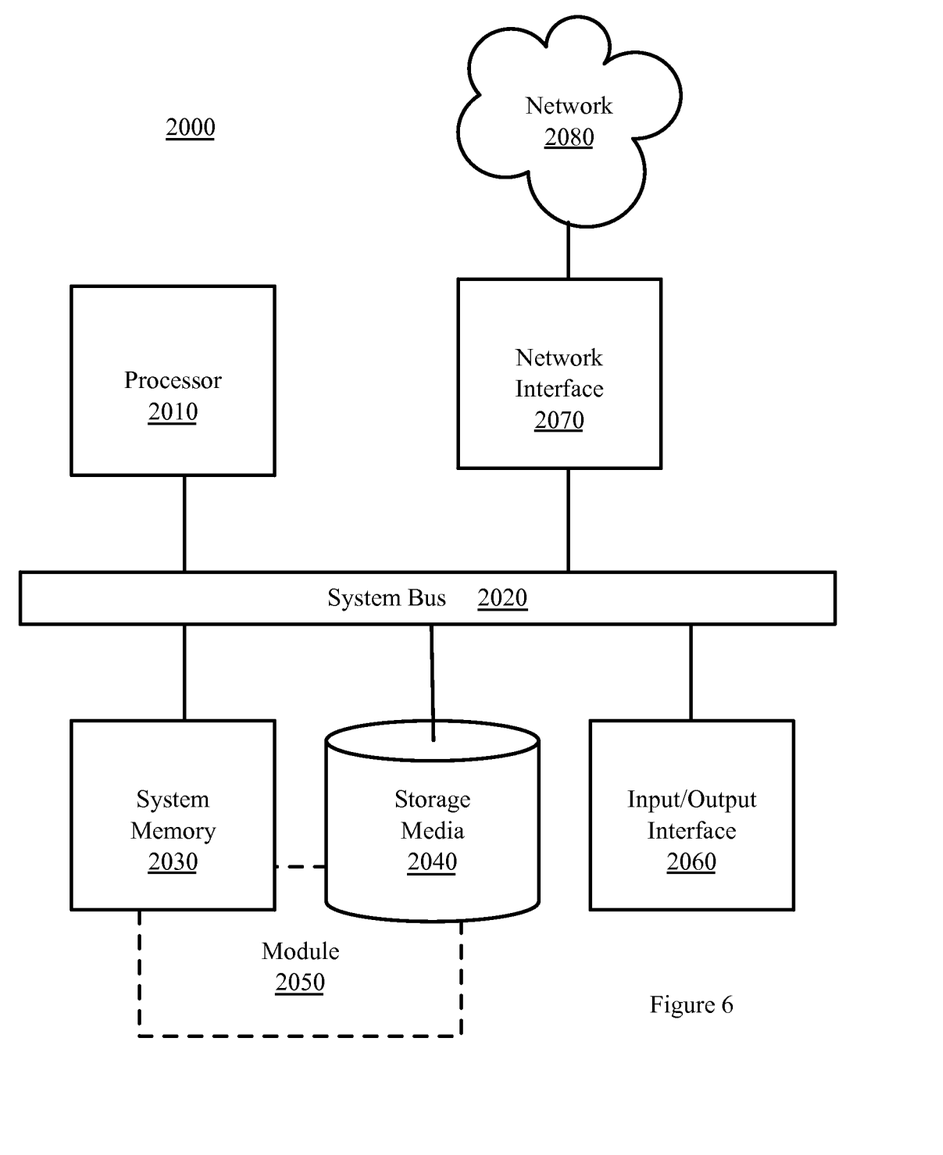
FIG. 6 is a block diagram depicting a computing machine and module, in accordance with certain example embodiments.

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to associate loyalty cards with locations for suggestion to users, comprising:
   receiving, by a user computing device and from one or more computing devices, information associated with one or more loyalty cards;
   displaying, by the user computing device, information associated with a particular loyalty card of the one or more loyalty cards;
   detecting, by the user computing device, that the displayed information associated with the particular loyalty card has been received by a reader device by detecting one or more of a reader device sound, a reader device light, and a network communication between the reader device and the computing device indicating that the displayed information is communicated to the reader device;
   logging a location of the user computing device at the time of detecting;
   associating, by the user computing device, the information associated with the particular loyalty card with the logged location in response to detecting that the information associated with the particular loyalty card has been received by the reader device;
   in response to an input, configuring, by the user computing device, an alert setting for the particular loyalty card comprising a display time range;
   determining, by the user computing device at a time after associating the information associated with the particular loyalty card with the logged location, that the user computing device is located within a specified distance of the logged location;
   in response to determining that the user computing device is located within the specified distance of the logged location:
      logging, by the user computing device, a timestamp;
      retrieving, by the user computing device, the information associated with the particular loyalty card associated with the logged location; and
      determining, by the user computing device, that the timestamp comprises a time within within the display time range associated with the particular loyalty card; and
   in response to determining that the timestamp comprises a time within the display time range associated with the particular loyalty card, displaying, by the user computing device, the retrieved information associated with the particular loyalty card.

2. The method of claim 1, wherein the association of the particular loyalty card program with the logged location is further based on location data and transaction data received from a computing device associated with a merchant at the particular location.

3. The method of claim 1, wherein determining that the user computing device has entered the area within the proximity of the logged location comprises receiving, from a computing device associated with a merchant at the logged location, a request to provide the information associated with the particular loyalty card associated with the logged location.

4. The method of claim 1, further comprising, at a time after associating the information associated with the particular loyalty card with the logged location, logging, by the user computing device, a second location of the user computing device, wherein determining that the user computing device has entered the area within the proximity of the logged location comprises determining that the second location is within the proximity of the logged location.

5. The method of claim 1, wherein displaying the information associated with the particular loyalty card comprises prioritizing the information associated with the particular loyalty card in a list of information associated with one or more loyalty cards.

6. A computer program product, comprising:
   a non-transitory computer-readable medium having computer-executable program instructions embodied thereon that when executed by a computing device cause the computing device to associate loyalty cards with locations for suggestion to users, the computer-executable program instructions comprising:
      computer-executable program instructions to receive information associated with one or more loyalty cards;
      computer-executable program instructions to display information associated with a particular loyalty card of the one or more loyalty cards;
      computer-executable program instructions to detect by the computing device that the displayed information associated with the particular loyalty card has been received by a reader device by detecting one or more of a reader device sound, a reader device light, and a network communication between the reader device and the computing device indicating that the displayed information is communicated to the reader device;

computer-executable program instructions to log a location of the computing device at the time of detection;

computer-executable program instructions to associate the information associated with the particular loyalty card with the logged location in response to detecting that the information associated with the particular loyalty card has been received by the reader device;

computer-executable program instructions to determine, at a time after associating the information associated with the particular loyalty card with the logged location, that the computing device has entered an area within a specified distance of the logged location;

computer-executable program instructions to retrieve the information associated with the particular loyalty card associated with the logged location in response to determining that that the computing device has entered the area within the specified distance of the logged location; and computer-executable program instructions to display the information associated with the particular loyalty card associated with the logged location.

7. The computer program product of claim 6, wherein associating the information associated with the particular loyalty card associated with the logged location comprises:

in response to detecting that the information associated with the particular loyalty card has been used in the transaction, displaying, via a user interface of the computing device, a request to associate the information associated with the particular loyalty card with the logged location; and in response to receiving an input via the user interface of the computing device, associating the information associated with the particular loyalty card with the logged location.

8. The computer program product of claim 6, wherein determining that that the computing device has entered the area within the proximity of the logged location comprises receiving, from a computing device associated with a merchant at the logged location, a request to provide the information associated with the particular loyalty card associated with the logged location.

9. The computer program product of claim 6, wherein detecting that the information associated with the particular loyalty card has been received by the reader device comprises detecting that the information associated with the particular loyalty card has been scanned by a merchant computing device from the user computing device.

10. The computer program product of claim 6, further comprising computer-executable program instructions to detect that the information associated with the particular loyalty card has been used in a transaction with the merchant by detecting a transmission of the information associated with the particular loyalty card to a merchant system computing device, wherein the information associated with the particular loyalty card is associated with the logged location further in response to detecting that the information associated with the particular loyalty card has been used in the transaction with the merchant.

11. The computer program product of claim 6, further comprising, computer-executable program instructions to log, at a time after associating the information associated with the particular loyalty card with the logged location, a second location of the user computing device, wherein determining that the user computing device has entered the area within the proximity of the logged location comprises determining that the second location is within the proximity of the logged location.

12. The computer program product of claim 6, wherein logging the location of the computing device at the time of detection comprises logging the location of the computing device via a global positioning system ("GPS") component of the computing device.

13. The computer program product of claim 6, wherein displaying the information associated with the particular loyalty card comprises prioritizing the information associated with the particular loyalty card in a list of information associated with the one or more loyalty cards.

14. A system to associate loyalty cards with locations for suggestion to users, comprising:

a storage device; and a processor communicatively coupled to the storage device, wherein the processor executes application code instructions that are stored in the storage device to cause the system to:

receive information associated with one or more loyalty cards;

display information associated with a particular loyalty card of the one or more loyalty cards;

detect that information associated with a particular loyalty card has been received by a reader device by detecting one or more of a reader device sound, a reader device light, and a network communication between the reader device and the computing device indicating that the displayed information is communicated to the reader device; and log a location of the system at the time of detecting;

associate the information associated with the particular loyalty card with the logged location in response to detecting that the information associated with the particular loyalty card has been received by the reader device;

at a time after associating the information associated with the particular loyalty card with the logged location, determine that the system has entered an area within a specified distance of the logged location;

retrieve the information associated with the particular loyalty card associated with the logged location in response to determining that that the system has entered the area within the specified distance of the logged location; and display the information associated with the particular loyalty card associated with the logged location.

15. The system of claim 14, wherein determining that the system has entered an area within the proximity of the logged location comprises receiving, from a computing device associated with a merchant at the logged location, a request to provide the information associated with the particular loyalty card associated with the logged location.

16. The system of claim 14, wherein detecting that the information associated with the particular loyalty card has been received by the reader device comprises detecting that the information associated with the particular loyalty card has been scanned by a merchant computing device from the user computing device.

17. The system of claim 14, wherein the processor is further configured to execute computer-executable program instructions that are stored in the storage device to cause the system to detect that the loyalty card has been used in a transaction with the merchant by detecting a transmission of the information associated with the particular loyalty card to a merchant system computing device, wherein the information associated with the particular loyalty card is associated with the logged location further in response to detecting that the information associated with the particular loyalty card has been used in the transaction with the merchant.

18. The system of claim 14, wherein the processor is further configured to execute application code instructions to cause the system, at a time after associating the information associated with the particular loyalty card with the logged location, to log a second location of the user computing device, wherein determining that the user computing device has entered the area within the proximity of the logged location comprises determining that the second location is within the proximity of the logged location.

19. The system of claim 14, wherein logging the location of the system at the time of detection comprises logging the location of the system via a global positioning system ("GPS") component of the system.

20. The system of claim 14, wherein displaying the information associated with the particular loyalty card comprises prioritizing the information associated with the particular loyalty card in a list of information associated with the one or more loyalty cards.

\* \* \* \* \*